United States Patent Office 3,390,393
Patented June 25, 1968

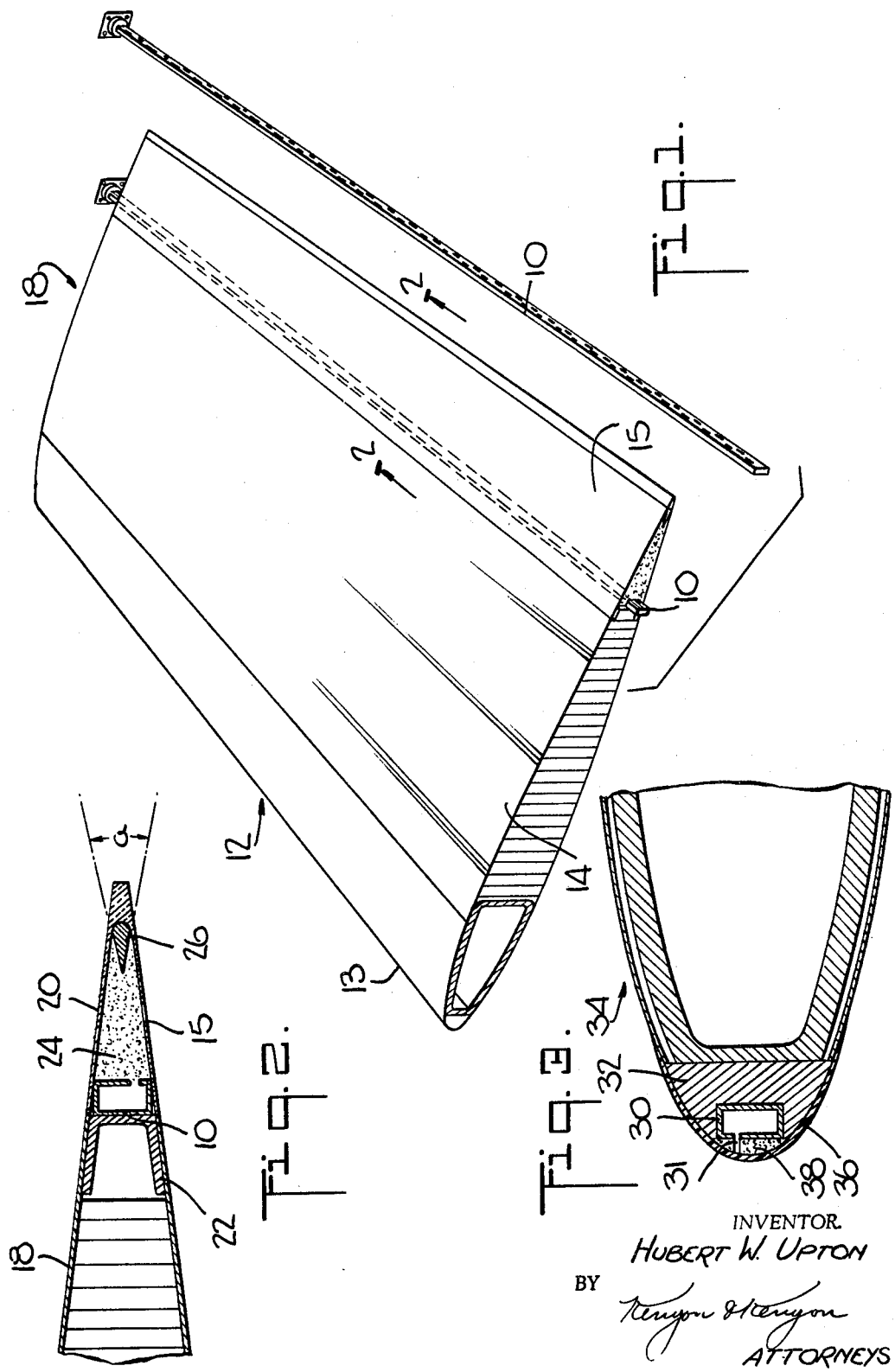

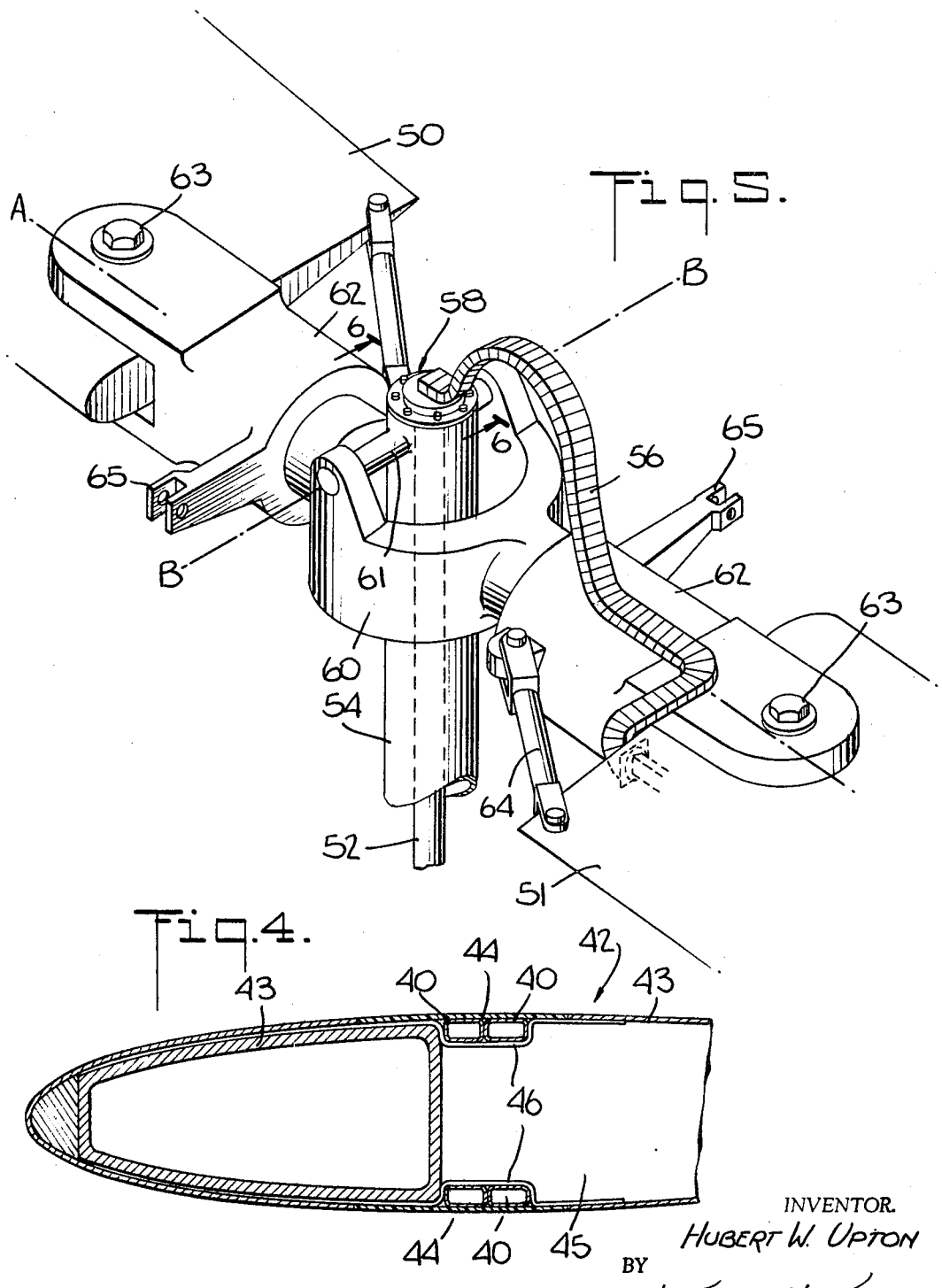

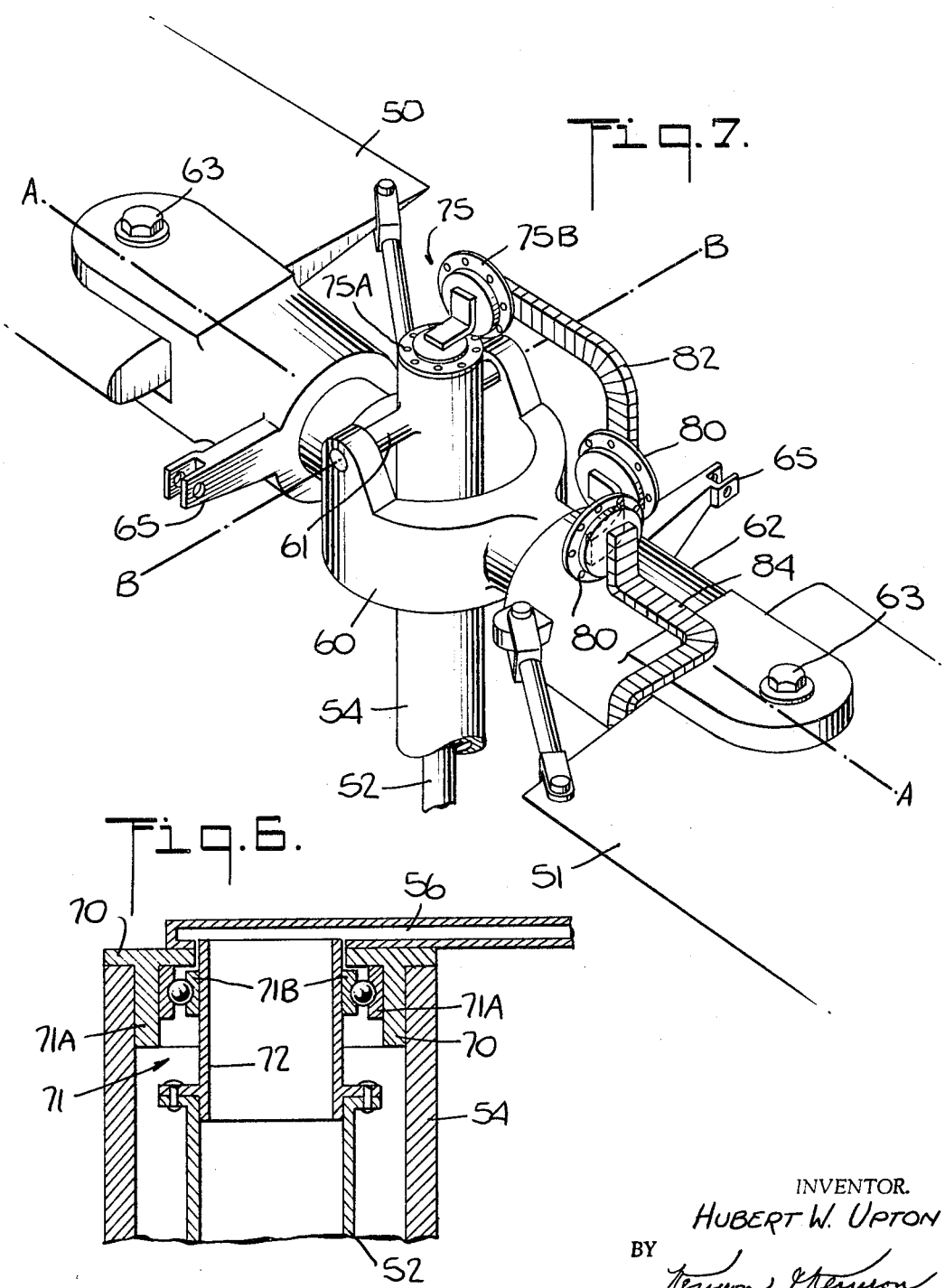

3,390,393
AIRFOIL RADAR ANTENNA
Hubert W. Upton, Arlington, Tex., assignor to Bell Aerospace Corporation, Wheatfield, N.Y., a corporation of Delaware
Filed Sept. 17, 1964, Ser. No. 397,090
12 Claims. (Cl. 343—708)

This invention relates in general to the use of radar antennas aboard rotary wing aircraft and more particularly to the deployment of a radar antenna within the rotor of a rotary wing aircraft.

Search radar are presently used aboard fixed wing aircraft for a number of purposes. They are employed to locate possible objects of collision such as other aircraft, constructions and mountains. They are also employed for target location, ground mapping, surveillance approach and landing. However, the use of search radar aboard rotary wing aircraft has hitherto appeared to be incompatible with the available space, power and performance characteristics of rotary wing aircraft. There are three specific reasons as to why the desirable characteristics for a search radar system appear incompatible with the design of rotary wing aircraft.

First, it is desirable that the radar antenna emit a narrow beam width in order to allow a clear and precise presentation of separate objects in the area of search. The width of the antenna beam is inversely related to the length of the antenna and thus an antenna of substantial length is desired. There is no apparent place on rotary wing aircraft to mount an antenna of adequate length.

Second, it is desirable that search radar have the capability of providing full azimuthal or 360° coverage, although in any specific case, as for collision avoidance, it may be desired to restrict the coverage to a sector of the 360°. To provide this capability of 360° coverage, the antenna must be placed outside of the fuselage and rotated. The rotation of an antenna of any substantial length at such a location creates aerodynamic drag that adversely affects performance of the aircraft and also requires a considerable increase in available power.

Third, it is desirable to spin the antenna at a scan rate sufficiently high so as to provide a continuous display to the pilot of the objects being detected by the radar system. A failure to develop adequate scan rate means a low input data rate which results in a jerky presentation of objects together with object motion on the display panel. However, to spin the antenna fast enough to obtain a continuous display requires a great deal of power and would thus mean a considerable increase in the power plant capacities of the helicopter with all that that means in the way of additional weight and increased fuel consumption leading to decreased helicopter versatility and range.

Accordingly, it is a major object of this invention to provide a radar antenna for use in a rotary wing aircraft that will permit satisfactory radar performance without deteriorating the operating characteristics of the rotary wing aircraft.

It is a related object of this invention to provide such a radar antenna in a fashion that will require a minimum of additional space.

It is another related object of this invention to provide such a radar antenna in a fashion that will require a minimum of additional power.

It is a further related purpose of this invention to provide such a radar antenna in a fashion that will have minimum impact on the flight performance of the aircraft and, in particular, will add a minimum of drag and weight to the aircraft.

In brief, the above objects are attained in this invention by incorporating the radar antenna in the rotor blades of the rotary wing aircraft. The radar antenna is laid out parallel to the main axis of the rotor blades and preferably extends through most of the length of the rotor blades. The radar antenna may be positioned in any one of a number of places in the rotor blade, including the nose-block, center section and trailing edge. However, wherever the antenna is located, the rotor blade must be designed to include a section transparent to radio waves that emanate from the radar antenna. In operation, the high scanning rate of the spinning rotor will provide a high data rate and thus good resolution of the image presented to the pilot.

Although the rotor blades must move in a fashion determined by navigational requirements, it has been found that they serve as adequate supports for the antenna. Thus, in spite of the fact that the blades flap and flex and change pitch, an antenna located in a rotor blade can be used to transmit and receive radar signals which will serve to present on a display an adequate presentation of the objects in the area of search.

Other objects and purposes of this invention will be apparent from a consideration of the following detailed description and darwings, in which:

FIG. 1 is a perspective view of a section of rotor blade in which the radar antenna is located near the trailing edge of the rotor blade (a section of antenna waveguide is laid out next to the embodiment to show the antenna that may be used);

FIG. 2 is a cross-sectional view of the trailing portion of the FIG. 1 rotor blade, taken along the plane 2—2;

FIG. 3 is a cross-sectional view of a portion of a rotor blade showing an antenna mounted in the nose-block of the rotor blade;

FIG. 4 is a cross-sectional view of a rotor blade showing an antenna mounted near the center portion of the rotor blade;

FIG. 5 indicates one fashion in which the antenna in the rotor blade may be electrically connected to a waveguide in the rotor shaft so as to be appropriately connected to the standard transmitting and receiving units carried aboard the aircraft;

FIG. 6 is a longitudinal cross-section of the top of the rotor mast along the plane 6—6 of FIG. 5; and FIG. 7 is a second arrangement showing the electrical connections between the antenna mounted in the rotor and the waveguide mounted in the rotor shaft.

The rotor blade section shown in FIGS. 1 and 2 illustrates an embodiment where a waveguide antenna 10 is mounted near the trailing edge of the rotor blade 12. The rotor blade 12 has a leading edge portion 13, a center portion 14 and a trailing portion 15. Only the ends of the section of waveguide antenna 10 that are embedded in the section of rotor blade 12 shown may be seen in FIG. 1. However, to facilitate visualizing the waveguide antenna 10, a portion of antenna 10 is shown in perspective next to the rotor blade 12. The antenna 10 used in the particular embodiment is a sixty slot linear array waveguide.

The skin 18 along most of the rotor blade is a metal sheet (aluminum or stainless steel) which is opaque to electromagnetic energy and would normally render the antenna inoperative. Thus it is important to design the rotor blade 12 so that the material in the vicinity of the antenna 10 is transparent to electromagnetic waves. Thus a glass fiber skin portion 20 is bonded to the underlying material at the trailing portion 15 of the rotor blade in lieu of metal skin. In the particular embodiment shown, the antenna 10 is laid out against the aft spar 22. A plastic filler 24 such as polyurethene foam is used to fill the space in the wedge-shaped area between the antenna 10 and the tip of the trailing portion 15 of the rotor blade. The plastic filler 24 and glass fiber skin 20 do not maintain the necessary rigidity at the very tip of the trailing portion 15 so that a small metal wedge 26 is incorporated at the tip of the trailing portion 15 in order to provide the desired rigidity. The metal wedge 26, if properly dimensioned and spaced from the antenna 10, will not materially interfere with the transmission or reception of waves by the antenna 10.

The rotor blade can be designed and constructed, for example, by increasing the rigidity of the aft spar 22, so that the metal wedge 26 is not required for purposes of rigidity and, in that event, the microwave energy will emanate unobstructed from the radar antenna.

The shape of the metal wedge 26 in the trailing portion embodiment illustrated enters into minimizing its effect on the antenna operation because a thin knife-type inwardly facing apex on wedge 26 will permit microwave energy to pass on both sides of the wedge and reform into a uniform pattern behind the blade. A blunt wedge would, on the other hand, cause the energy to be deflected and thus cause a discontinuity or separating of the emitted wave. It has been found that an angle "a" of 30° provides a satisfactory compromise between the dimensional requirements for the wedge 26 and minimum interference with the antenna 10 operation.

The antenna 10 can be formed of a slotted aluminum waveguide having a wall of 0.010 inch and a cross-section of 0.6 inch by 0.3 inch. The exact waveguide used for the antenna 10 will necessarily be determined by the application and radar equipment with which it is employed. The selection of the desired waveguide will be in accordance with principles known to persons skilled in the radar art.

The antenna 10 extends longitudinally along the rotor blade and is limited in length only by the length of the rotor blade 12. An antenna length of 173 inches can provide a beam width of approximately 0.33°, which will make available a high degree of radar resolution. Since most present day operational helicopters use rotor blades at varying lengths from approximately 192 inches to 864 inches, it can be seen that this invention can provide a radar antenna with sharp resolution.

In the FIG. 3 embodiment, an antenna 30 (which may be similar to the slotted waveguide 10 illustrated in FIG. 1) is embedded in a groove in the nose-block 32. A plastic filler 38, which is transparent to electromagnetic radiation, fills out the nose-block portion of this rotor blade 34, except for a series of slots 31 that connect to the slots in the waveguide 30. A skin 36 is bonded to the nose-block 32 and plastic filler 38 to complete the construction of this forward portion of the blade. The transparency to electromagnetic radiation of the plastic filler 38 and the skin 36 permits radiation from the antenna forward of the blade 34.

The skin 36 at the leading end of the blade 34 is made from a material such as Esthane so as to provide an erosion shield. The erosion shield not only protects the leading edge from the effects of dust, dirt and rain but also keeps the antenna slots 31 from being eroded. The antenna slots 31 lead from the waveguide 30 slots to the antenna leading edge. A view directly into the blade 34 leading edge will show a slot pattern identical to that of the waveguide 10, that is, the slots through the leading edge match the slots in waveguide 10 in both size and position. The purpose of the slots 31 is to permit the emanation of microwave energy, and hence, they must not be covered by anything but a material transparent to microwave energy, which is the erosion shield 36. The shield 36 must also have good erosion resistant properties. It could be bonded over a slotted steel leading edge, or it can replace the leading edge nose-block 32. It can be of Esthane, a polyurethane material, and is bonded by a technique typical of rotor blade construction.

FIG. 4 illustrates an embodiment where the antenna 40 is placed along the sides of the rotor blade between the nose-block and trailing portion edge of a rotor blade 42. The metal skin 43 along most of the rotor blade 42 gives way to a glass fiber fabric skin 44 adjacent to the antenna 40. The antenna 40 consists of two waveguides (each similar to the waveguide 10 in FIG. 1) along each side of each rotor blade 42 (a total of four waveguides per rotor blade). Each waveguide is laid out along a slot formed in the aluminum honeycomb core 45 that constitutes the main portion of the rotor blade 42. The slot so formed is backed by an aluminum strip 46 so as to give adequate support to the waveguide 40. The waveguides can be used to create a single beam pattern or they can be used to create separate beam patterns. Separate beam patterns can be used in conjunction with well-known radar switching techniques to provide a higher scan rate.

The principle of operation of the antenna in the three positions illustrated is not significantly different as far as this invention is concerned. An influence on positioning of the antenna will be the use for which the radar is intended. For example, if it were to be used for ground mapping, it would be desirable to locate the waveguides at the leading or trailing edge; while if air detection was the purpose, then the top of the rotor blade would appear to be desirable. Of course, the waveguides can be located in any combination of positions and will have to be designed specifically for their respective positions and intended uses. It should be appreciated that the physical environment of each position is different and the waveguide would not be alternatively placed in one position or the other without redesign. For example, the character of the rotor blade as a reflector to the transmitted energy is different in each position and will in this manner affect operation of the antenna.

FIG. 5 illustrates one technique of connecting the rotor antenna to the various portions of the radar equipment which equipment is normally carried within the helicopter itself. In FIG. 5, the inboard portion of the rotors 50, 51 of a two-bladed helicopter rotor are illustrated. Connections are shown which illustrate one means for connecting the antenna in one rotor blade 51 to a waveguide 52, which waveguide 52 extends through the center of the mast 54. To simplify the disclosure, the connections to the antenna and only one blade (the blade 51) are shown although it will be obvious that identical or similar connections can be made to an antenna in the rotor blade 50. Indeed, if other than a two-bladed rotor is involved, similar connections can be made to the antennas in each of the rotors.

In FIG. 5, a flexible waveguide 56 is employed to make the connection between the central waveguide 52 (which extends up through the mast 54) and the rotor 51 antenna (not shown). The flexible waveguide 56 is coupled to the waveguide 52 in the mast 54 by means of a rotary waveguide joint 58. The rotary waveguide joint 58 and the flexible features of the flexible waveguide 56 together serve to accommodate the various changes in position that take place between the rotor 51 and the central waveguide 52.

The central waveguide 52 is supported at its bottom point (not shown) in fixed position relative to the fuselage so that the mast 54 rotates about the waveguide 52. The mast 54 rotates about the waveguide 52, either because it is driven by the engine or because it is driven by aerodynamic forces acting on the rotor blades 50, 51. Accordingly, the rotary waveguide joint 58 is necessary so that when the mast 54 and rotor blades 50, 51 are in rotation, electrical connection can be maintained between the center mast waveguide 52 and the flexible waveguide 56.

A yoke 60 is pivotally mounted on trunnions 61 which extend from the mast 54. The yoke 60 in turn has two extensions which mate with the grips 62 by means of bearings so that rotary motion of the grips 62 about the yoke 60 extensions may be had. The grips 62 in turn bolt onto the rotor blades 50, 51 by means of bolts 63. Drag braces 64 prevent the rotor blades 50, 51 from rotating about the main axis of the bolt 63. By means of controls linked to the pitch horn 65, the pitch angle of the blades 50, 51 may be controlled by the pilot rotating the rotor blades 50, 51 and grips 62 about the axis A—A relative to the yoke 60 and the mast 54. It is in this fashion that the pitch of the rotor blades is changed. In addition, the mounting bewteen the trunnions 61 and the yoke 60 establishes a flapping axis B—B about which rotation or flapping will take place. The flexible features of the waveguide 56 make it possible to accommodate to the rotation and flapping about the axes A—A and B—B.

FIG. 6 shows, in somewhat greater detail, the means by which the rotary joint 58 joins the flexible waveguide 56 to the central mast waveguide 52. The rotary waveguide joint itself includes a cap 70 that is connected to the mast 54 and a bearing 71 which has an outer race 71A connected to the cap 70 and an inner race 71B. The inner race 71B is connected to a shaft 72. A flexible waveguide 56 is connected to the cap 70 and shaft 123 is connected to the stationary center mast waveguide 52 as shown. Thus when the mast 54 rotates, the cap 70 and outer race 71A will rotate carrying the flexible waveguide 56; while the shaft 72 and inner race 71B will remain stationary relative to the waveguide 52.

FIG. 7 illustrates a further refinement to the connecnections that may be made between the stationary waveguide 52 and the rotor mounted antenna. In the FIG. 7 embodiment, two doubly rotating joints 75 and 80 are employed. These joints 75 and 80 are coupled together by a flexible waveguide 82. One joint 75A (of the double rotating joint 75) performs the same function as does the rotary waveguide joint 58 described in connection with the FIG. 5 embodiment. The other joint 75B provides for greater flexibility along the flapping axis B—B than is provided by simply having a flexible waveguide alone. The second double rotating joint 80 provides for greater flexibility along both the flapping axis B—B and the pitch axis A—A than may be provided by a flexible waveguide alone. The double rotating joint 80 is connected to the antenna in the rotor blade 51 by means of a flexible waveguide 84. The other elements of the FIG. 7 embodiment are similar to the elements of the FIG. 5 embodiment and thus the same numerical designations are applied since the description in connection with the FIG. 5 embodiment is appropriate to these elements and need not be repeated here.

As a practical matter, an antenna is placed in more than one rotor blade either in order to increase the data rate or to be phased together to act as one long antenna.

What is claimed is:

1. In a high resolution, narrow beam, search radar system, the antenna improvement comprising:
    a rotatable airfoil, said airfoil being flexible in a direction perpendicular to the plane of rotation of said airfoil, and
    a slotted waveguide deployed within said airfoil along a substantial portion of the length of said airfoil near the trailing edge of said airfoil, the slots of said waveguide facing outwardly toward the trailing edge of said airfoil, the skin of said airfoil adjacent said waveguide being formed of a material that is transparent to radiation.

2. The improvement of claim 1 wherein said airfoil is a rotor blade adapted for use in a rotary wing aircraft.

3. The improvement of claim 1 wherein said waveguide has a length sufficiently great so as to provide a radar beam width of less than one degree.

4. The improvement of claim 2 wherein said waveguide has a length sufficiently great so as to provide a radar beam width of less than one degree.

5. In a rotor blade adapted for use in a rotary wing aircraft, the improvement comprising:
    a slotted waveguide deployed within said blade along a substantial portion of the length of said blade near the trailing edge of said blade, the slots of said waveguide facing outwardly toward the trailing edge of said blade,
    a radiation deflecting wedge between said waveguide and said trailing edge of said blade, and
    a reinforcing metal wedge constituting the trailing edge of said blade, said metal wedge having an apex facing inwardly toward the slots of said waveguide,
    the skin of said rotor blade adjacent said waveguide and said radiation deflecting wedge being formed of a material that is transparent to radiation.

6. The invention of claim 5 wherein the inwardly facing apex of said reinforcing metal wedge has an angle of approximately 30°.

7. In a high resolution, narrow beam, search radar system, the antenna improvement comprising:
    a rotatable airfoil, said airfoil being flexible in a direction perpendicular to the plane of rotation of said airfoil,
    a slotted waveguide deployed within said airfoil along a substantial portion of the length of said airfoil near the leading edge of said airfoil, the slots of said waveguide facing outwardly toward the leading edge of said airfoil, and
    a transparent to radiation sector between said waveguide and said leading edge of said airfoil,
    the skin of said airfoil adjacent said sector being formed of a material that is transparent to radiation.

8. The improvement of claim 7 in which said airfoil is a rotor blade adapted for use in a rotary wing aircraft.

9. The improvement of claim 7 wherein said waveguide has a length sufficiently great so as to provide a radar beam width of less than one degree.

10. The improvement of claim 8 wherein said waveguide has a length sufficiently great so as to provide a radar beam width of less than one degree.

11. In a rotor blade adapted for use in a rotary wing aircraft, the improvement comprising:
    a slotted waveguide deployed within said blade along a substantial portion of the length of said blade near the leading edge of said blade, the slots of said waveguide facing outwardly toward the leading edge of said blade,
    the sector of said blade between said waveguide and said leading edge of said blade including a plurality of slots, each one of said slots in said sector being matched to an individual slot in said waveguide whereby a path is created from the slots of said waveguide whereby radiation may be emitted from the leading edge of said blade,
    the skin of said rotor blade adjacent said slots of said sector being formed of a material that is transparent to radiation.

12. In a rotor blade adapted for use in a rotary wing aircraft, the improvement comprising:
    a first pair of adjacent waveguides deployed within said blade along a substantial portion of the length of said blade near the central portion of the top surface of said blade, the slots of each of said waveguides facing outwardly toward the skin of said top surface of said blade, and
    a second pair of adjacent waveguides deployed within said blade along a substantial portion of the length of said blade near the bottom surface of said blade, the slots of both of said waveguides facing outwardly toward the skin of said bottom surface of said blade, the skin of said rotor blade adjacent said waveguides being formed of a material that is transparent to radiation.

References Cited

UNITED STATES PATENTS

| | | | |
|---|---|---|---|
| 2,242,200 | 5/1941 | Woods | 343—705 |
| 2,423,528 | 7/1947 | Stewart | 170—160.23 |
| 2,495,748 | 1/1950 | Matson | 343—705 X |
| 3,044,066 | 7/1962 | Butler | 343—771 |
| 3,144,646 | 8/1964 | Breithaupt | 343—708 |
| 3,166,750 | 1/1965 | Ball | 343—765 X |
| 3,174,552 | 3/1965 | Soucy | 170—160.23 |

FOREIGN PATENTS

| | | |
|---|---|---|
| 1,210,077 | 9/1959 | France. |
| 756,083 | 5/1953 | Germany. |

ELI LIEBERMAN, *Primary Examiner.*